United States Patent
Watanabe et al.

[11] Patent Number: 6,097,850
[45] Date of Patent: *Aug. 1, 2000

[54] MEASURING METHOD AND APPARATUS OF PHOTOGRAPHIC PARAMETER AND COMPUTER MEMORY PRODUCT

[75] Inventors: Masaki Watanabe; Shuichi Shiitani, both of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/848,178

[22] Filed: Apr. 29, 1997

[30] Foreign Application Priority Data

Nov. 27, 1996 [JP] Japan ................................. 8-316692

[51] Int. Cl.$^7$ .................................................. G06K 9/40
[52] U.S. Cl. ........................................... 382/275; 382/100
[58] Field of Search ..................... 382/286, 289, 382/291, 255, 225, 107, 100, 275; 354/432

[56] References Cited

U.S. PATENT DOCUMENTS

| | | | |
|---|---|---|---|
| 4,603,960 | 8/1986 | Zeth et al. | 354/432 |
| 4,783,833 | 11/1988 | Kawabata et al. | 382/107 |
| 5,193,124 | 3/1993 | Subbarao | 382/255 |
| 5,263,097 | 11/1993 | Katz et al. | 382/225 |
| 5,488,675 | 1/1996 | Hanna | 382/291 |
| 5,832,139 | 11/1998 | Batterman et al. | 382/191 |

Primary Examiner—Yon J. Couso
Attorney, Agent, or Firm—Staas & Halsey LLP

[57] ABSTRACT

A method of measuring an unknown photographic parameter (distortion coefficient or focal length) from an image taken by a camera of which photographic parameter is unknown. An image to be measured is entered, the photographic parameter to be measured (distortion coefficient or focal length) is designated, an image region necessary for measuring the photographic parameter in the image to be measured is designated, a characteristic relating to the photographic parameter to be measured is extracted from the designated image region, and the photographic parameter is calculated according to a specified operation processing on the basis of the quantity and position of the extracted characteristic.

18 Claims, 6 Drawing Sheets

MEASURING METHOD AND APPARATUS OF PHOTOGRAPHIC PARAMETER AND COMPUTER MEMORY PRODUCT

BACKGROUND OF THE INVENTION

1. Field of the Invention

The present invention relates to a method and apparatus for measuring a distortion coefficient, focal length or any other photographic parameter of a camera through a picture taken by the camera, and also relates to a computer storage medium for a computer program used to execute this method.

2. Description of the Prior Art

Hitherto, photographic parameters of a camera such as distortion coefficient and focal length have been measured by taking a point of known coordinates placed in a three-dimensional space and by observing the taken image. FIG. 1 (PRIOR ART) is a schematic diagram for showing a constitution of an apparatus for such conventional measuring method. In FIG. 1, symbol V represents a lattice point object, and plural lattice points of known two-dimensional coordinates are provided in the lattice point object V. Reference numeral 51 is a camera, which takes the lattice point object V plural times by varying the object distance, delivers the image data to an image display device 52 and a lattice point position extracting unit 53. The image display device 52 displays the image of the lattice point object V depending on the entered image data.

The lattice point position extracting unit 53 extracts the position on the image about the lattice point designated by user input from a pointing device 54, determines the image coordinates of the designated lattice point, and delivers same to a photographic parameter calculating unit 55. The photographic parameter calculating unit 55 calculates the photographic parameters of the camera 51 including the distortion parameter and focal length parameter, on the basis of the entered image coordinates of lattice point and distance to the camera 51 and the actual known three-dimensional coordinates of the lattice point, and delivers same to a photographic parameter outputting unit 56. The photographic parameter outputting unit 56 converts the calculated photographic parameters into character data or the like, and delivers same outside.

Recently, along with the advancement of the multimedia, processing images taken by camera is increasing. In this case, considering the photographic parameters of the camera used in taking the image, the image is processed by separating, combining or editing. Among the images to be processed, however, the kinds of cameras taking the images are often unknown and photographic conditions of the images are often unknown, that is, images of unknown photographic parameters of the camera used in taking pictures are included. In such a case, an image cannot be taken again by using a camera of unknown photographic conditions, and it is impossible to determine the photographic parameters of the camera by the conventional method. As a result, the image processing must be executed by using the image of unknown photographic parameters of the camera, and accurate image processing cannot be done.

BRIEF SUMMARY OF THE INVENTION

It is hence an object of the invention to provide a measuring method and apparatus of photographic parameter capable of accurately measuring photographic parameters (distortion coefficient, focal length) of the camera used in taking an image on the basis of the image taken by a camera of which photographic parameters are unknown.

It is another object of the invention to provide a computer memory product storing a computer program for executing such measurement of photographic parameters.

According to the measuring method of photographic parameter of the invention, a part of image region is selected from a taken image, a characteristic relating to a photographic parameter at the time of taking the image to be measured is determined from the selected image region, and the photographic parameter is calculated according to the specified operation processing on the basis of the determined characteristic. The photographic parameter to be measured includes the distortion coefficient and focal length of the photographic means used in taking the image.

To measure the distortion coefficient of the photographic means for taking the image, an image region including a portion to be straight in the absence of distortion is selected, plural edge elements are extracted from the selected image region, coordinates of the extracted edge elements on the image are determined, and the distortion coefficient is calculated on the basis of the determined coordinates.

To measure the focal length of the photographic means for taking the image, four image regions including four straight lines originally composing a rectangle are selected, plural edge elements are extracted from each selected image region, coordinates of the extracted edge elements on the image are determined, a straight line is obtained in each image region on the basis of the determined coordinates of the edge elements, coordinates on the image at the vertices of the rectangle having the obtained four straight lines as the sides are determined, and the focal length is calculated on the basis of the determined coordinates of the four vertices.

The above and further objects and characteristics of the invention will more fully be apparent from the following detailed description with accompanying drawings.

DETAILED DESCRIPTION OF THE INVENTION

Figure 1:
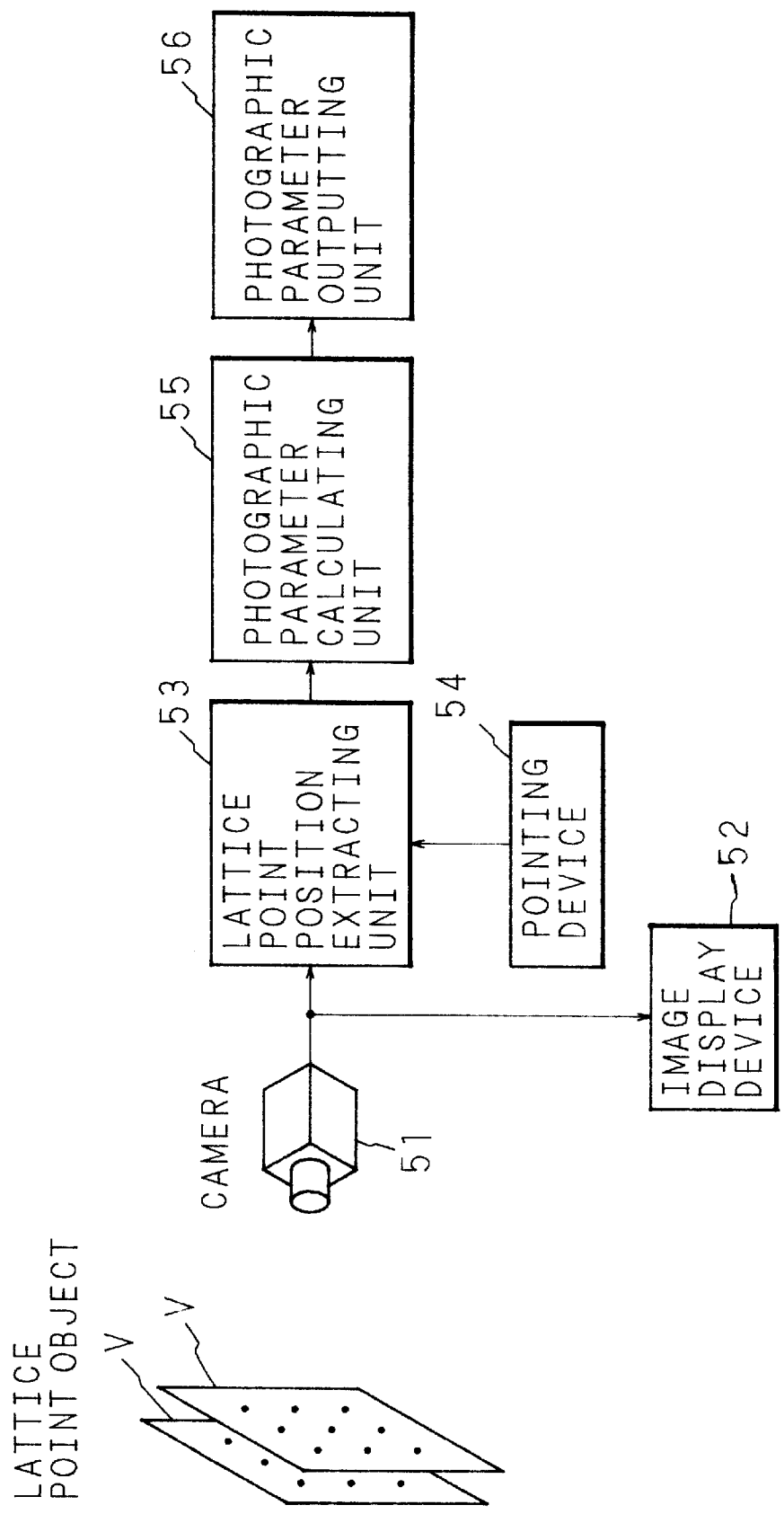
FIG. 1 (PRIOR ART) is a schematic diagram showing a constitution of an apparatus for executing a conventional measuring method of photographic parameter.
Figure 2:
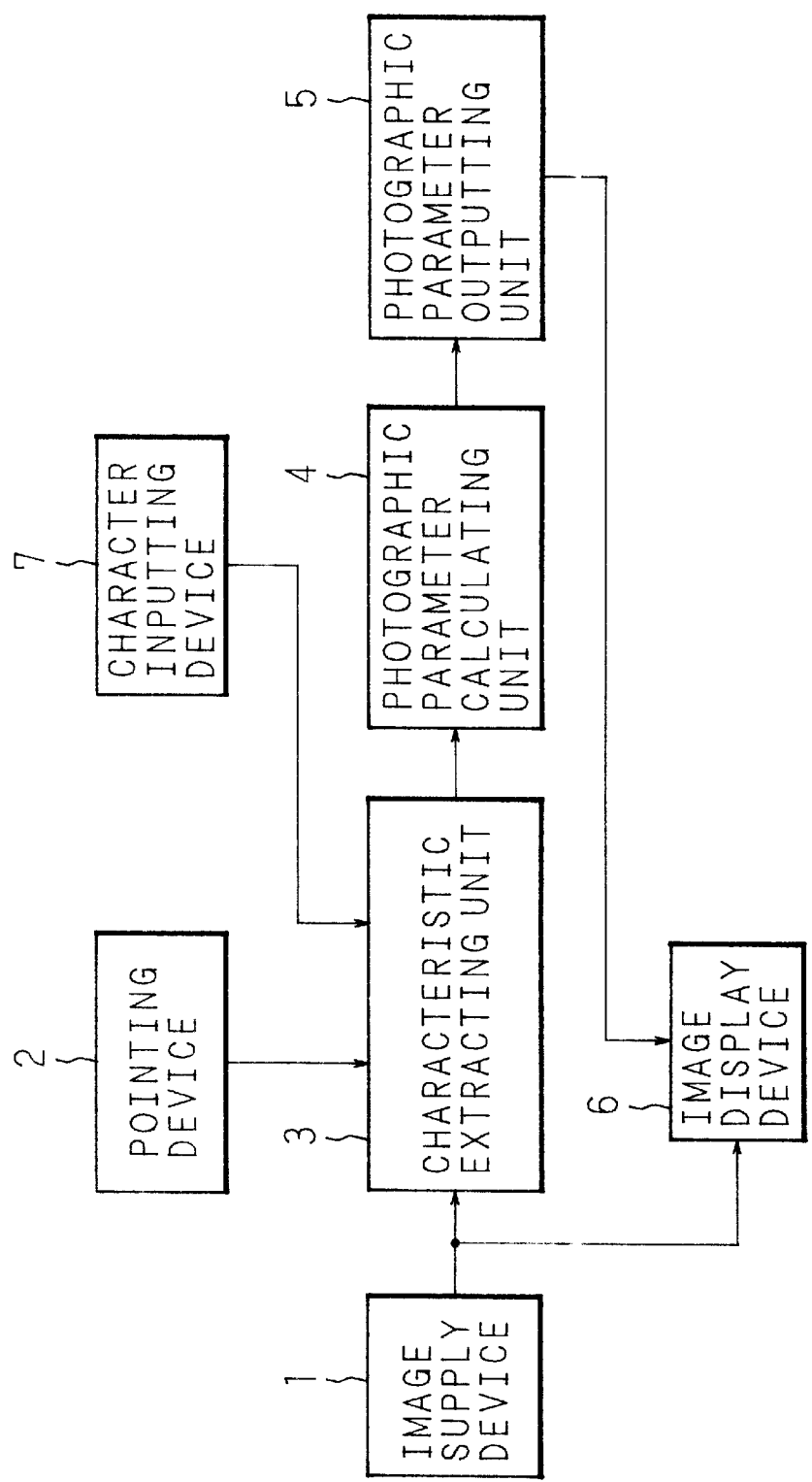
FIG. 2 is a structural diagram of a measuring apparatus of photographic parameter according to the invention.

FIG. 2 is a structural diagram of a measuring apparatus of photographic parameter according to the invention. An image calibration apparatus comprises an image supply device 1 for supplying an object image for measuring a photographic parameter, a pointing device 2 for designating the kind of photographic parameter to be measured and a part of image region of the image supplied from the image supply device 1 by GUI (Graphical User Interface), a characteristic extracting unit 3 for extracting a characteristic for measuring the photographic parameter from the image region designated by the pointing device 2, and a photographic parameter calculating unit 4 for calculating the photographic parameter on the basis of the characteristic amount and characteristic position in the extracted characteristic.

The measuring apparatus of photographic parameter of the invention further comprises, in addition to the above constitution, a photographic parameter outputting unit 5 for outputting the photographic parameter calculated in the photographic parameter calculating unit 4, and an image display device 6 for displaying the image supplied from the image supply device 1 and the calculated photographic parameter. The photographic parameter outputting unit 5 delivers the photographic parameter calculated in the photographic parameter calculating unit 4 into the image display device 6 in a form of graphic data or character pattern, and the image display device 6 displays the image to be measured, and also displays the calculated photographic parameter in a form of text or graphics.

Meanwhile, by installing a character inputting device 7, in place of the pointing device 2, the kind of photographic parameter to be measured may be designated by GUI, character, numeral or the like.

Figure 3:
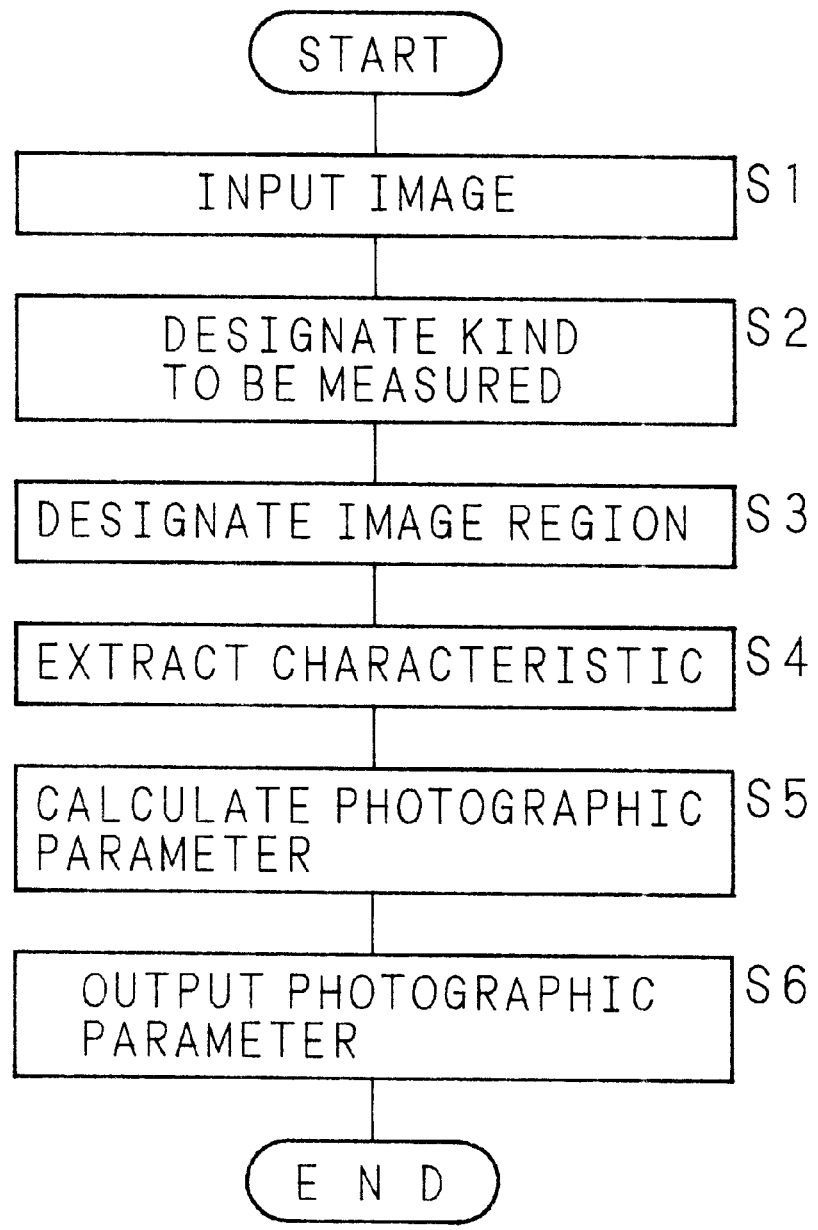
FIG. 3 is a flowchart showing the operating procedure of measuring method of photographic parameter according to the invention.

The operation for measuring photographic parameter is described below. FIG. 3 is a flowchart showing its operating procedure. The object image for measuring the photographic parameter is inputted into the characteristic extracting unit 3 and image display device 6 from the image supply device 1 (step S1). In the image display device 6, the object image is displayed. By the pointing device 2 or character inputting device 7, the kind of photographic parameter to be measured (distortion coefficient, focal length) is inputted into the characteristic extracting unit 3 (step S2). In consequence, from the object image entered in the characteristic extracting unit 3, a part of image region for referring to the photographic parameter is designated by the pointing device 2 (step S3). Herein, the image region relating to the photographic parameter is designated. For example, when measuring the distortion coefficient, the image region including a portion which is originally straight but is curved due to distortion is designated.

The characteristic (for example, edge element) in the designated image region is extracted by the characteristic extracting unit 3, and its characteristic amount and characteristic position are delivered to the photographic parameter calculating unit 4 (step S4). In the photographic parameter calculating unit 4, the photographic parameter is calculated on the basis of the entered characteristic amount and characteristic position, and the calculated photographic parameter is delivered to the photographic parameter outputting unit 5 (step S5). From the photographic parameter outputting unit 5 to the image display device 6, the calculated photographic parameter is delivered as graphic data or character pattern (step S6). The calculated photographic parameter is displayed as text or graphics in the image display device 6.

The characteristic to be extracted from the designated image region may be designated by the user from outside, or it may be designated automatically by image processing from a designated image region.

Embodiments of the invention are specifically described below. In the following embodiments, as the photographic parameter, the distortion coefficient (first embodiment) and focal length (second embodiment) are measured.

Figure 4:
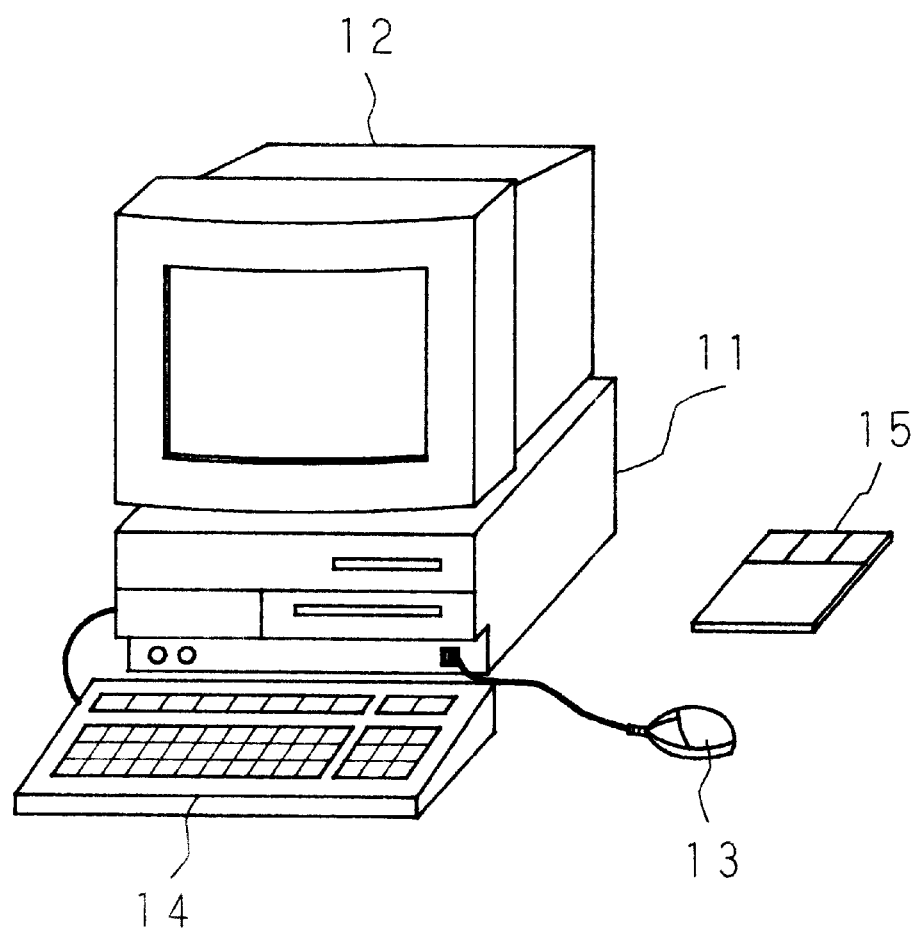
FIG. 4 is a schematic diagram showing a system configuration in an embodiment of the invention.

FIG. 4 is a schematic diagram showing a basic configuration of the system as an embodiment of the invention, and this system comprises a personal computer 11 as user terminal, a display 12 as image display device 6 for displaying object image and calculated photographic parameter, a mouse 13 as pointing device 2 connected to the personal computer 11, and a keyboard 14 as character inputting device 7 connected thereto. The personal computer 11 loads a program for making such processing as extraction of characteristic in a designated image region and calculation of designated photographic parameter, from a computer memory product 15, such as a magnetic disk in which the program is recorded. The characteristic extracting unit 3, photographic parameter calculating unit 4 and photographic parameter outputting unit 5 in FIG. 2 are incorporated in the software of the personal computer 11.

(First embodiment: Measurement of distortion coefficient)

Figure 5:
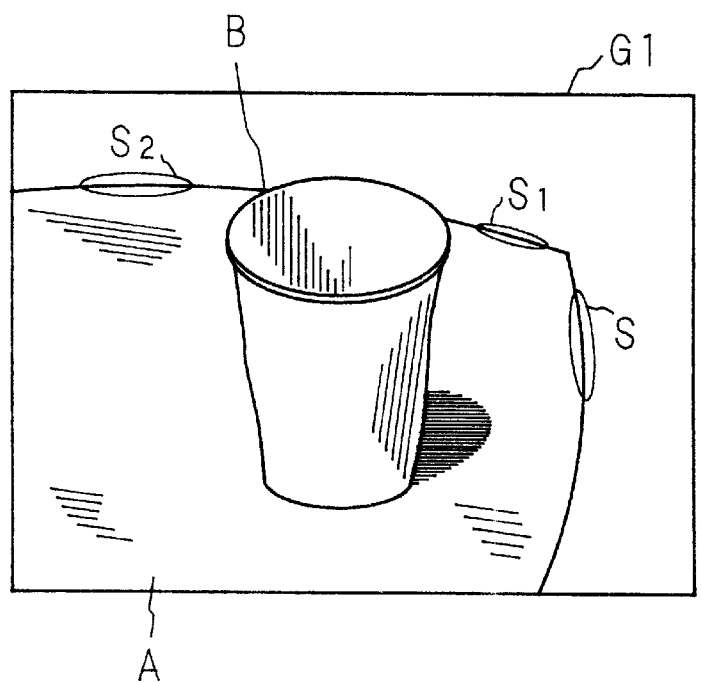
FIG. 5 is a diagram showing an object image and a designated image region in a first embodiment.

First, an object image G1 as shown in FIG. 5 is supplied from the image supply device 1 into the characteristic extracting unit 3 and display 12 (S1). The supplied image G1 is displayed on the display 12. The image G1 shown in FIG. 5 is an image of taking a scene in which a container (paper cup) B in an inverted truncated cone with an open top is put on a desk A. As the photographic parameter to be measured, the user selects "distortion" by using the mouse 13 or keyboard 14 (S2). Consequently, while observing the object image displayed on the display 12, the user designates a part of the image region S from the object image by using the mouse 13 (S3). In this case, the image region S to be designated includes a portion (edge of desk A) which is originally straight but is curved due to distortion. In place of the image region S, plural image regions, for example, two image regions S1 and S2 in the curve which ought to be originally straight may be designated.

In the characteristic extracting unit 3, from the designated image region S, edge elements are extracted by edge extracting operator which is a technique of space filter processing (S4), such as Sobel operator, Canny operator or the like. If n edge elements are extracted from the corresponding image region S, the x-coordinate and y-coordinate of each edge element position on the image, and the edge strength by output of edge extracting operator are respectively supposed to be $x_i'$, $y_i'$, and $E_i$ (i=0, ..., n−1). These obtained data are delivered into the photographic parameter calculating unit 4, and the distortion coefficient as photographic parameter is calculated in the photographic parameter calculating unit 4 in the following technique on the basis of these data (S5).

Suppose, for example, this image is distorted radially by distortion coefficient κ. That is, assuming this image to be I' (x', y') (x' and y' are known), and the image after correction of distortion to be I (x, y) (x and y are unknown), the following formulas (1) and (2) are established.

$$x'=x\{1-\kappa(x^2+y^2)\} \quad (1)$$

$$y'=y\{1-\kappa(x^2+y^2)\} \quad (2)$$

The straight line (edge of desk A) originally supposed to form a row of each edge element mentioned above is defined in formula (3) which is called Hesse's standard figure.

$$-x \sin \theta + y \cos \theta = \rho \quad (3)$$

where θ and ρ are parameters for determining a straight line,

θ: angle formed between perpendicular drawn straightly from the origin and x-axis ρ: distance from origin of xy coordinate system to straight line In each one of the above edge elements, formulas (1) to (3) are obtained, and unknown x and y are eliminated from these formulas (1) to (3), and one equation expressed by three unknown quantities κ, θ, ρ is obtained. By thus processing in at least three edge elements, at least three equations expressed by three unknown quantities are obtained, and by solving these simultaneous equations, the distortion coefficient κ in this image can be obtained.

The edge strength $E_i$ of each edge element is used for weighting in the above calculation process. That is, a large weight is given at the edge point of a sharp edge element, and a small weight is applied at the edge point of a less sharp edge element.

Incidentally, by designating the image region at one point and processing the above calculation on one straight line, the distortion coefficient κ can be calculated, but by designating image regions at plural points and processing the above calculation on each one of plural straight lines, the distortion coefficient κ can be judged comprehensively, and the precision of calculation can be enhanced. In this case, in the calculation processing on each straight line, the parameters θ and ρ are mutually different on each straight line, and the parameter κ is the same on all straight lines. For example, in FIG. 5, the above calculation may be processed on both a straight line which the image region S ought to be and a straight line which the image regions S1 and S2 ought to be.

Thus calculated distortion coefficient κ is sent into the display 12 through the photographic parameter outputting unit 5 in a format of character pattern data (S6). The calculated value of distortion coefficient κ is displayed on the display 12 together with the object image.

(Second embodiment: Measurement of focal length)

Figure 6:
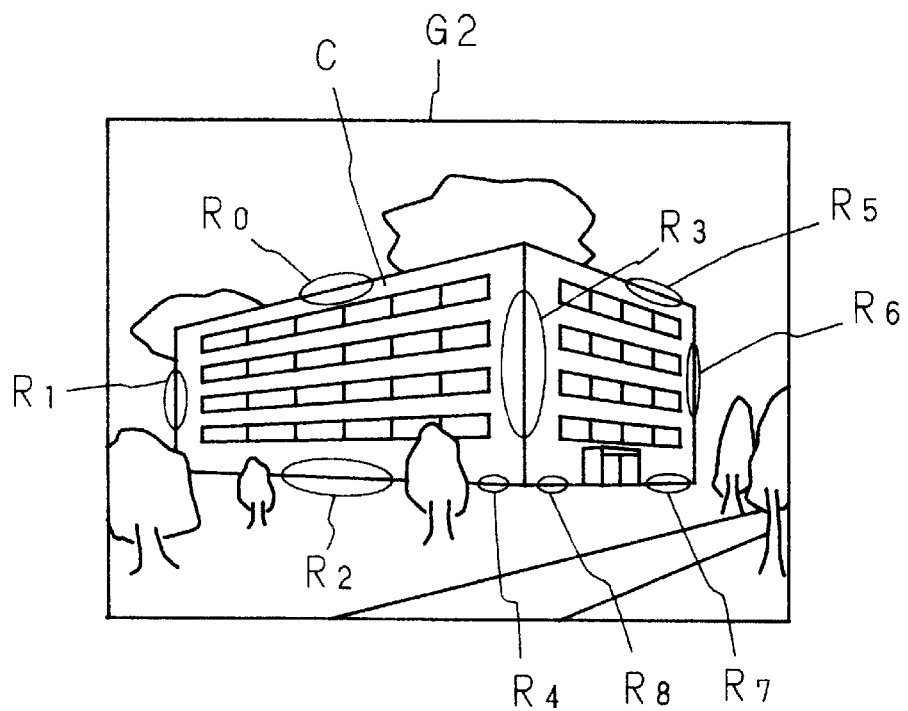
FIG. 6 is a diagram showing an object image and a designated image region in a second embodiment.

First, the object image G2 as shown in FIG. 6 is supplied into the characteristic extracting unit 3 and display 12 from the image supply device 1 (S1). The supplied image G2 is displayed on the display 12. The image G2 shown in FIG. 6 is an image of taking a scene of an apartment housing C. As the photographic parameter to be measured, the user selects "focal length" by using the mouse 13 or keyboard 14 (S2). In succession, while observing the object image displayed on the display 12, the user designates four image regions $R_i$ (i=0, ... , 3) including four straight lines, originally supposed to be forming a rectangle in the photographic space, by using the mouse 13 (S3). An image region $R_4$ may be designated additionally as a portion supposed to form the lower straight line.

Consequently, from each one of the four designated image regions $R_i$, edge elements are extracted by edge extracting operator such as Sobel operator, Canny operator or the like in the characteristic extracting unit 3 (S4). If $n_i$ edge elements are extracted from each one of the image regions $R_i$, the x-coordinate and y-coordinate of each edge element position on the image, and the edge strength by output of edge extracting operator are respectively supposed to be $X_{ij}$, $Y_{ij}$, $E_{ij}$ (i=0, ... , 3, j=0, ... , $n_1$−1).

The extracted edge elements are assigned with a straight line by the method of least squares individually in each image region $R_i$. At this time, the edge strength is used as weighting. That is, a large weight is given at the edge point of a sharp edge element, and a small weight is applied at the edge point of a less sharp edge element. The obtained four straight lines are four sides for forming a rectangle, and a rectangle having their intersections as the vertices is obtained. The x-coordinate and y-coordinate of four intersections on the image are respectively $x_i$ and $y_i$ (i=0, ... , 3).

These obtained data are delivered to the photographic parameter calculating unit 4, and the focal length is calculated as the photographic parameter according to the calculating process as shown below on the basis of these data in the photographic parameter calculating unit 4 (S5).

Supposing the provisional focal length to be f' (an arbitrary value), the desired focal length f is determined in the following formula (4).

$$f = f' \times \sqrt{-\frac{(m_{0x}m_{1x} + m_{0y}m_{1y})}{m_{0f}m_{1f}}} \quad (4)$$

In formula (4), however, $m_{0x}$, $m_{0y}$, $m_{0f}$ are vector elements of $m_0$, that is, $m_0=(m_{0x}, m_{0y}, m_{0f})^\tau$, and $m_{1x}$, $m_{1y}$, $m_{1f}$ are vector elements of $m_1$, that is, $m_1=(m_{1x}, m_{1y}, m_{1f})^\tau$.

Incidentally, $m_0$, $m_1$ are expressed in formulas (5) and (6).

$$m_0 = \frac{n_0 \times n_1}{|n_0 \times n_1|} \quad (5)$$

$$m_1 = \frac{n_2 \times n_3}{|n_2 \times n_3|} \quad (6)$$

In formulas (5) and (6), $n_0$, $n_1$, $n_2$, $n_3$ are expressed respectively in the following formulas (7) through (10).

$$n_0 = \frac{(y_3 - y_0 - x_3 + x_0\{y_0(x_3 - y_0) - x_0(y_3 - y_0)\}/f')^T}{|(y_3 - y_0 - x_3 + x_0\{y_0(x_3 - y_0) - x_0(y_3 - y_0)\}/f')^T|} \quad (7)$$

$$n_1 = \frac{(y_2 - y_1 - x_2 + x_1\{y_1(x_2 - y_1) - x_1(y_2 - y_1)\}/f')^T}{|(y_2 - y_1 - x_2 + x_1\{y_1(x_2 - y_1) - x_1(y_2 - y_1)\}/f')^T|} \quad (8)$$

$$n_2 = \frac{(y_1 - y_0 - x_1 + x_0\{y_0(x_1 - y_0) - x_0(y_1 - y_0)\}/f')^T}{|(y_1 - y_0 - x_1 + x_0\{y_0(x_1 - y_0) - x_0(y_1 - y_0)\}/f')^T|} \quad (9)$$

$$n_3 = \frac{(y_3 - y_2 - x_3 + x_2\{y_2(x_3 - y_2) - x_2(y_3 - y_2)\}/f')^T}{|(y_3 - y_2 - x_3 + x_2\{y_2(x_3 - y_2) - x_2(y_3 - y_2)\}/f')^T|} \quad (10)$$

Assuming one rectangle, by processing the above calculation, the focal length f can be calculated, but by assuming plural rectangles and processing the above operation on each rectangle, the focal length f can be judged comprehensively, and the precision of calculation can be enhanced. Concretely, image regions $R_5$, $R_6$, $R_7$ and $R_8$ are further designated as shown in FIG. 6 and the above calculation may be processed on a rectangle formed by four straight lines corresponding to image regions $R_3$, $R_5$, $R_6$, $R_7$ and $R_8$.

Thus calculated focal length f is sent into the display 12 through the photographic parameter outputting unit 5 in a format of character pattern data (S6). Then the calculated value of focal length f is displayed on the display 12 together with the object image.

Thus, according to the invention, on the basis of the image taken by the camera of which photographic parameters are unknown, the photographic situation may be assumed and the unknown photographic parameters can be measured, so that the image taken by the camera of which photographic parameters are unknown can be processed more accurately by separating, combining or editing. When measuring the photographic parameter, meanwhile, since the characteristic for calculating the photographic parameter from the image region designated by the user can be extracted automatically by the image processing, the user does not have to designate the characteristic, and therefore the user is not required to know the quantities such as the image coordinates, size, and others of the characteristic.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method for measuring a distortion coefficient, a focal length or any other photographic parameter of a camera from a single image taken by the camera, the method comprising the steps of:

deciding the kind of photographic parameter for measurement;

selecting an object image region in the single image so as to extract characteristics of the photographic parameter therefrom;

executing the extraction of the characteristics from the selected image region in the single image; and calculating the photographic parameter in accordance with the extracted characteristics.

2. The method for measuring according to claim 1, wherein the photographic parameter is a parameter selected from a group consisting of the distortion coefficient and the focal length used in taking the image.

3. The method for measuring according to claim 1, wherein selection of an object image region includes the step of selecting an image region containing a linear portion when no distortion is present, and the extraction of characteristics of the photographic parameter includes the steps of extracting one or more edge elements from the object image region, determining the coordinates of the extracted edge elements on the image, and calculating a distortion coefficient by reference to the coordinates.

4. The method for measuring according to claim 3, wherein the distortion coefficient κ to be measured is calculated by solving the simultaneous equations of (1) through (3), supposing the coordinates of the edge element on the image to be (x', y') and the coordinates of the edge element being corrected of distortion to be (x, y), $$x' = x\{1 - \kappa(X^2 + y^2)\} \quad (1)$$

$$x' = y\{1 - \kappa(X^2 + y^2)\} \quad (2)$$

$$-x \sin \theta + Y \cos \theta = \rho \quad (3)$$

where equation (3) is an equation of a straight line composed by each edge element being free from distortion, and θ is the angle formed between perpendicular lines drawn from the origin and the x-axis, and ρ is the distance from the origin of the xy coordinate system to the straight line of equation (3).

5. The method for measuring according to claim 1, wherein the photographic parameter is the focal length of the camera used in taking the image, said step of selecting the image region includes a step of selecting four image regions having four straight lines originally composing a rectangle, and said step of determining the characteristic includes a step of extracting plural edge elements from each selected image region, a step of determining the coordinates of the extracted edge elements on the image, a step of obtaining a straight line in each image region on the basis of the determined coordinates of the edge elements, a step of determining the coordinates on the image of the vertices of the rectangle having the obtained four straight lines as the sides, and a step of calculating the focal length on the basis of the determined coordinates of four vertices.

6. The method for measuring according to claim 5, wherein supposing the determined coordinates of the four vertices on the image to be $(x_i, y_i)$ (i=0, . . . , 3), the provisional focal length as an arbitrary value to be f', and the focal length to be measured to be f, the focal length f is calculated in the following formula (4):

$$f = f' \times \sqrt{-\frac{(m_{0x}m_{1x} + m_{0y}m_{1y})}{m_{0f}m_{1f}}} \quad (4)$$

in formula (4), however, $m_{0x}$, $m_{0y}$, $m_{0f}$ are vector elements of $m_0$ ($m_0 = (m_{0x}, m_{0y}, m_{0f})^T$), and $m_{1x}$, $m_{1y}$, $m_{1f}$ are vector elements of $m_1$ ($m_1 = (m_{1x}, m_{1y}, m_{1f})^T$); and $m_0$, $m_1$ are expressed in the following formulas (5) and (6), $$m_0 = \frac{n_0 \times n_1}{|n_0 \times n_1|} \quad (5)$$

$$m_1 = \frac{n_2 \times n_3}{|n_2 \times n_3|} \quad (6)$$

further, in formulas (5) and (6), $n_0$, $n_1$, $n_2$, $n_3$ are expressed respectively in the following formulas (7) through (10):

$$n_0 = \frac{(y_3 - y_0 - x_3 + x_0\{y_0(x_3 - y_0) - x_0(y_3 - y_0)\}/f')^T}{|(y_3 - y_0 - x_3 + x_0\{y_0(x_3 - y_0) - x_0(y_3 - y_0)\}/f')^T|} \quad (7)$$

$$n_1 = \frac{(y_2 - y_1 - x_2 + x_1\{y_1(x_2 - y_1) - x_1(y_2 - y_1)\}/f')^T}{|(y_2 - y_1 - x_2 + x_1\{y_1(x_2 - y_1) - x_1(y_2 - y_1)\}/f')^T|} \quad (8)$$

$$n_2 = \frac{(y_1 - y_0 - x_1 + x_0\{y_0(x_1 - y_0) - x_0(y_1 - y_0)\}/f')^T}{|(y_1 - y_0 - x_1 + x_0\{y_0(x_1 - y_0) - x_0(y_1 - y_0)\}/f')^T|} \quad (9)$$

$$n_3 = \frac{(y_3 - y_2 - x_3 + x_2\{y_2(x_3 - y_2) - x_2(y_3 - y_2)\}/f')^T}{|(y_3 - y_2 - x_3 + x_2\{y_2(x_3 - y_2) - x_2(y_3 - y_2)\}/f')^T|} \quad (10)$$

7. A measuring apparatus for measuring a photographic parameter when taking an image on the basis of the taken image, comprising:

means for selecting a part of an image region from a single image;

means for determining a characteristic relating to the photographic parameter to be measured from the selected image region in the single image; and means for calculating the photographic parameter according to a specified operation processing on the basis of the determined characteristic.

8. The measuring apparatus according to claim 7, wherein the photographic parameter is a parameter selected from a group consisting of the distortion coefficient and the focal length of the photographic means used in taking the image.

9. The measuring apparatus according to claim 7, further comprising means for designating the kind of photographic parameter to be measured.

10. The measuring apparatus according to claim 8, further comprising means for designating the kind of photographic parameter to be measured.

calculating the photographic parameter according to a specified operation processing on the basis of the acquired characteristics.

11. A computer memory product storing a computer program for measuring a photographic parameter at the time of taking a single image on the basis of the single taken image incorporated into a computer, said computer program comprising the steps of:

extracting a part of an image region from the incorporated single taken image according to an external input;

acquiring a characteristic relating to the photographic parameter to be measured from the extracted image region of the single taken image; and calculating the photographic parameter according to a specified operation processing on the basis of the acquired characteristics.

12. The computer memory product according to claim 11, wherein the photographic parameter is a parameter selected from a group consisting of the distortion coefficient and the focal length of the photographic means used in taking the image.

13. A computer memory product having computer readable program code means capable of being read by a computer for measuring a photographic parameter at the time of taking a single image on the basis of the single taken image incorporated into the computer, said computer readable program code means comprising:

program code means for causing the computer to extract a part of an image region from the incorporated single taken image according to an external input;

program code means for causing the computer to acquire a characteristic relating to the photographic parameter to be measured from the extracted image region of the single taken image; and program code means for causing the computer to calculate the photographic parameter according to a specified operation processing on the basis of the acquired characteristic.

14. The computer memory product according to claim 13, wherein the photographic parameter is a parameter selected from a group consisting of the distortion coefficient and the focal length of the photographic means used in taking the image.

15. A method for measuring a distortion coefficient, a focal length or any other photographic parameter of a camera through an image taken by the camera, the method comprising the steps of:

deciding the kind of a photographic parameter for measurement;

selecting an object image region containing a linear portion when no distortion is present to extract characteristics of the photographic parameter;

extracting one or more edge elements from the object image region and determining the coordinates of the extracted edge elements on the image; and calculating a distortion coefficient by reference to the coordinates.

16. The method for measuring according to claim 15, wherein the distortion coefficient κ to be measured is calculated by solving the simultaneous equations of (1) through (3), supposing the coordinates of the edge element on the image to be (x', y') and the coordinates of the edge element being corrected of distortion to be (x, y), $$x' = x\{1 - \kappa(X^2 + y^2)\} \tag{1}$$

$$x' = y\{1 - \kappa(X^2 + y^2)\} \tag{2}$$

$$-x \sin\theta + Y \cos\theta = \rho \tag{3}$$

where equation (3) is an equation of a straight line composed by each edge element being free from distortion, and θ is the angle formed between perpendicular lines drawn from the origin and the x-axis, and ρ is the distance from the origin of the xy coordinate system to the straight line of equation (3).

17. The method for measuring according to claim 15, wherein the photographic parameter is the focal length of the camera used in taking the image, said step of selecting the image region includes selecting four image regions having four straight lines originally composing a rectangle, and said step of extracting includes extracting plural edge elements from each selected image region, determining the coordinates of the extracted edge elements on the image, obtaining a straight line in each image region on the basis of the determined coordinates of the edge elements, determining the coordinates on the image of the vertices of the rectangle having the obtained four straight lines as the sides, and calculating the focal length on the basis of the determined coordinates of four vertices.

18. The method for measuring according to claim 17, wherein supposing the determined coordinates of the four vertices on the image to be $(x_i, y_i)$ (i=0, . . . , 3), the provisional focal length as an arbitrary value to be f', and the focal length to be measured to be f, the focal length f is calculated in the following formula (4):

$$f = f' \times \sqrt{-\frac{(m_{0x}m_{1x} + m_{0y}m_{1y})}{m_{0f}m_{1f}}} \tag{4}$$

in formula (4), however, $m_{0x}$, $m_{0y}$, $m_{0f}$ are vector elements of $m_0$ ($m_0 = (m_{0x}, m_{0y}, m_{0f})^T$), and $m_{1x}$, $m_{1y}$, $m_{1f}$ are vector elements of $m_1$ ($m_1 = (m_{1x}, m_{1y}, m_{1f})^T$); and $m_0$, $m_1$ are expressed in formulas (5) and (6)

$$m_0 = \frac{n_0 \times n_1}{|n_0 \times n_1|} \tag{5}$$

$$m_1 = \frac{n_2 \times n_3}{|n_2 \times n_3|} \tag{6}$$

further, in formulas (5) and (6), $n_0$, $n_1$, $n_2$, $n_3$ are expressed respectively in the following formulas (7) through (10):

$$n_0 = \frac{(y_3 - y_0 - x_3 + x_0\{y_0(x_3 - y_0) - x_0(y_3 - y_0)\}/f')^T}{|(y_3 - y_0 - x_3 + x_0\{y_0(x_3 - y_0) - x_0(y_3 - y_0)\}/f')^T|} \tag{7}$$

$$n_1 = \frac{(y_2 - y_1 - x_2 + x_1\{y_1(x_2 - y_1) - x_1(y_2 - y_1)\}/f')^T}{|(y_2 - y_1 - x_2 + x_1\{y_1(x_2 - y_1) - x_1(y_2 - y_1)\}/f')^T|} \tag{8}$$

$$n_2 = \frac{(y_1 - y_0 - x_1 + x_0\{y_0(x_1 - y_0) - x_0(y_1 - y_0)\}/f')^T}{|(y_1 - y_0 - x_1 + x_0\{y_0(x_1 - y_0) - x_0(y_1 - y_0)\}/f')^T|} \tag{9}$$

$$n_3 = \frac{(y_3 - y_2 - x_3 + x_2\{y_2(x_3 - y_2) - x_2(y_3 - y_2)\}/f')^T}{|(y_3 - y_2 - x_3 + x_2\{y_2(x_3 - y_2) - x_2(y_3 - y_2)\}/f')^T|} \tag{10}$$

\* \* \* \* \*

UNITED STATES PATENT AND TRADEMARK OFFICE
CERTIFICATE OF CORRECTION

PATENT NO.    : 6,097,850
DATED         : August 1, 2000
INVENTOR(S)   : Watanabe et al.

Page 1 of 1

It is certified that error appears in the above-identified patent and that said Letters Patent is hereby corrected as shown below:

Title page,
Item [63], please change "Fujitsu Limited" to -- FUJITSU LIMITED --.

Column 8,
Lines 62-64, please delete these lines in their entirety.

Signed and Sealed this

Twenty-fifth Day of December, 2001

Attest:

Attesting Officer

JAMES E. ROGAN
Director of the United States Patent and Trademark Office